(12) United States Patent
Busch et al.

(10) Patent No.: US 9,085,323 B2
(45) Date of Patent: Jul. 21, 2015

(54) METAL REINFORCEMENT FOR B-PILLAR

(75) Inventors: Andreas Busch, Reichshof (DE); Reiner Quick, Cologne (DE); Chris Curtis, Leverkusen (DE); Thomas Mueller, Cologne (DE); Hessel C. Van Dijk, Voorschoten (NL)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/006,113

(22) PCT Filed: Feb. 24, 2012

(86) PCT No.: PCT/EP2012/053133
§ 371 (c)(1),
(2), (4) Date: Sep. 19, 2013

(87) PCT Pub. No.: WO2012/126697
PCT Pub. Date: Sep. 27, 2012

(65) Prior Publication Data
US 2014/0008938 A1 Jan. 9, 2014

(30) Foreign Application Priority Data
Mar. 23, 2011 (DE) .................. 10 2011 005 977

(51) Int. Cl.
*B62D 25/04* (2006.01)
*B62D 29/00* (2006.01)

(52) U.S. Cl.
CPC .............. *B62D 25/04* (2013.01); *B62D 29/007* (2013.01); *Y10T 29/49622* (2015.01)

(58) Field of Classification Search
CPC ............................ B62D 25/04; B62D 29/007
USPC ........................................ 296/187.12, 193.06
See application file for complete search history.

(56) References Cited

U.S. PATENT DOCUMENTS

| 8,491,046 | B2 * | 7/2013 | Nagai et al. | 296/193.05 |
| 2008/0315628 | A1 * | 12/2008 | Obayashi | 296/193.06 |
| 2012/0161475 | A1 * | 6/2012 | Mori | 296/193.06 |
| 2013/0020835 | A1 * | 1/2013 | Szuba | 296/193.06 |
| 2014/0191536 | A1 * | 7/2014 | Elfwing et al. | 296/193.06 |

FOREIGN PATENT DOCUMENTS

CN 201980296 U * 9/2011

* cited by examiner

*Primary Examiner* — Jason S Morrow
(74) *Attorney, Agent, or Firm* — Joseph E. Root

(57) ABSTRACT

A metal reinforcement for a B-pillar of an automotive vehicle includes a lower flange and an upper structure. The lower flange is adapted to adjoin a door sill structure of the automotive vehicle, and the upper structure includes a central portion, surrounded by a plurality of spaced, paired regions. In each paired region, members are identically ordered in position from the central portion, and both members of each paired region have the same profile thickness.

8 Claims, 3 Drawing Sheets

METAL REINFORCEMENT FOR B-PILLAR

TECHNICAL FIELD

Embodiments of the present disclosure generally relate to reinforcing components of an automotive vehicle, and more specifically to reinforcing the pillars of an automotive vehicle.

BACKGROUND

Vertical support pillars, such as B-pillars, provide structural support to a vehicle, as well as additional strength during a side impact. As the name implies, automotive pillars are upright structures, generally labeled with letters, the B-pillar generally being located between the front and rear doors of an automobile. In addition to strength, B-pillars also enable continuous sealing between the frame and respective door around the full periphery of the door opening. Due to the increasing legal and market demands for safety, the width of the B-pillar has increased over the years. However, the thickness of the metal reinforcement need not be the same through its entire length. For instance, the metal reinforcement in the lower portion, where the B-pillar adjoins the door sill, requires relatively low strength and rigidity. Conversely, the upper half of the metal reinforcement requires higher strength and rigidity to ensure that, the B-pillar is deformed to the smallest possible extent in the event of a side crash.

Conventionally, the B-pillar consists of multiple components. Typically, these components include three inner plates, a reinforcement sheet, a nut plate, and an outer side panel. The use of multiple parts increases weight, which increases the manufacturing costs. Further, increased weight also decreases fuel efficiency. Existing technologies have optimized the design of the metal reinforcement to decrease its weight, optimization in that direction may sacrifice structural support.

Considering the problems mentioned above, and other shortcomings in the art, there exists a need for a more optimized design of a metal reinforced sheet for a B-pillar of an automotive vehicle, without compromising the safety of the occupants.

SUMMARY

Additional aspects, advantages, features and objects of the present disclosure would be made apparent from the drawings and the detailed description of the illustrative embodiments construed in conjunction with the appended claims that follow.

In one aspect, the present disclosure provides a metal reinforcement for a B-pillar of an automotive vehicle. The metal reinforcement includes a lower flange, and an upper structure integral with the lower flange. The lower flange is adapted to adjoin a door sill structure of the vehicle. The upper structure is formed of a central portion and a plurality of paired regions spaced from the central region. The members of each paired region are identically ordered in position from the central portion. Further, the members of each pair have an equal profile thickness.

In another aspect, the present disclosure provides method for producing a pair of metal reinforcements for a left and a right B-pillar of an automotive vehicle. The method tailor rolls a hot-formed metallic strip to form a plurality of regions of varying thickness therein. Further, the method punches a pair of plates from the strip. The plates are arranged adjacent to each other, and one plate is rotated 180 degrees with respect to each other, and are mutually offset from each other. Further, the method punches the pair of plates from the strip. Finally, the method hot forms the pair of plates to produce the pair of metal reinforcement B-pillar reinforcement.

DETAILED DESCRIPTION OF ILLUSTRATIVE EMBODIMENTS

The following detailed description illustrates aspects of the disclosure and its implementation. This description should not be understood as defining or limiting the scope of the present disclosure, however, such definition or limitation being solely contained in the claims appended thereto. Although the best mode of carrying out the invention has been disclosed, those in the art would recognize that other embodiments for carrying out or practicing the invention are also possible.

The B-pillar of an automotive vehicle is generally provided with a shell construction, including an internal shell and an external shell. The external shell is implemented in one piece with a lateral frame, which also forms an external shell for an A-pillar, a lateral sill board, and a roof lateral frame, as well as a rear fender. This lateral frame, which also forms the external shell of the B-pillar, is made of a relatively thin plate having a plate thickness of approximately 0.8 mm. The B-pillar thus does not have sufficient strength and rigidity in the area of door hinges and in the area of a door lock. Further, the strength of the B-pillar is also insufficient for avoiding significant deformation of the B-pillar in the event of a lateral crash. Therefore, a reinforcement sheet is required to increase the strength and the rigidity of the B-pillar.

Figure 1:
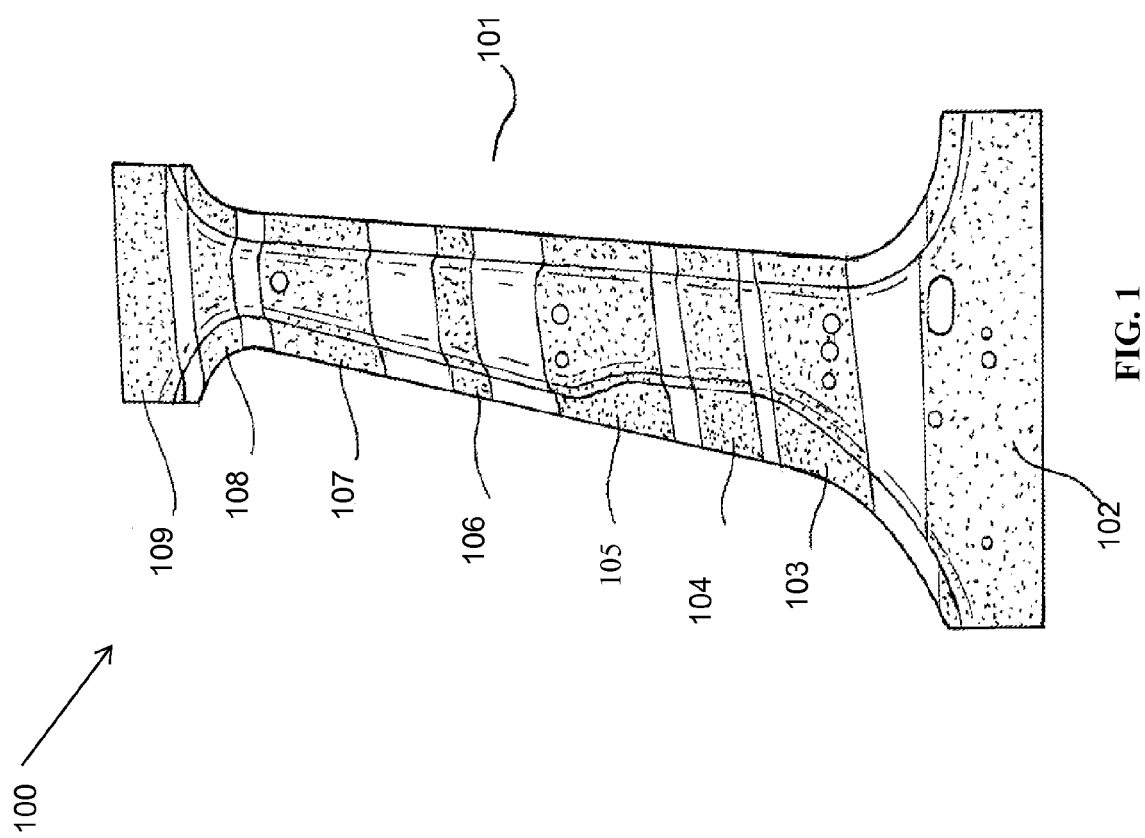
FIG. 1 is a top view of a metal reinforcement for a B-pillar of an automotive vehicle, according to an embodiment of the present disclosure.

FIG. 1 is a top view of a metal reinforcement 100 for a B-pillar of an automotive vehicle. The metal reinforcement 100 exhibits varying profile thickness and extends over the entire height of the B-pillar. The metal reinforcement includes a lower flange 102 and an upper structure 101. The upper structure 101 is a formed of multiple regions 103-109. The upper structure includes a central region 106, and multiple paired regions 103, 104, 105, 107, 108, and 109. These regions are grouped into three pairs; the regions 103 and 109 form the first pair, the regions 104 and 108 form the second pair, and the regions 105 and 107 form the third pair. The regions within each pair are identically ordered in position from the central portion 106. Further, the regions within each pair have equal thickness. The regions 103, 104 and 105 are positioned below, and the regions 107, 108 and 109 are positioned above the central region 106. Continuous transitions extend between the regions 103-109 and the lower flange 102. Specifically, thicknesses changes from region to region occur smoothly, with the sudden jumps.

The lower flange 102 of the metal reinforcement 100 attaches to the door sill. Because the B-pillar requires low strength and rigidity in the areas adjoining the door sill, the lower flange 102 has a relatively small profile thickness. The upper structure 101 of the metal reinforcement 100 is configured to attach to the door hinges and joints, to ensure the safety of the passenger in the event of a side crash. This structure requires significantly higher rigidity and strength than does lower flange 102, and thus the regions 103-109 are much thicker than regions in the lower flange 102.

In one embodiment, the lower flange 102 has the smallest profile thickness, which can be about 1.35 mm. Further, the two regions 103 and 109 of the first pair may have a profile thickness of about 2.3 mm, the regions 104 and 108 of the second pair may have a profile thickness of about 2.1 mm, and the regions 105 and 107 of the third pair may have a profile thickness of about 2.4 mm. The central region 106 is the thickest of the set, having a thickness of about 2.7 mm.

Figure 2:
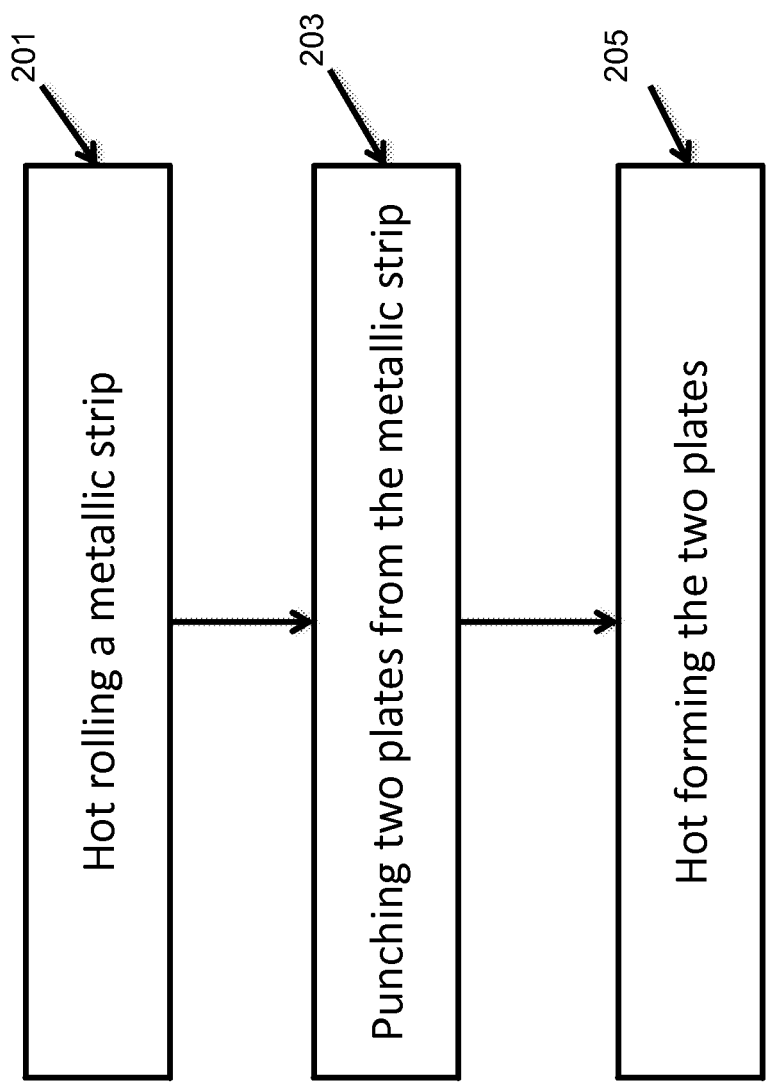
FIG. 2 is a flowchart describing a process for producing two metal reinforcements for a right and a left B-pillar of an automotive vehicle, according to an embodiment of the present disclosure.

FIG. 2 is a flowchart 200 describing a method for producing two metal reinforcements 100 for a left and a right B-pillar of an automotive vehicle. In step 201, a metallic strip 301 is hot rolled using an industrial hot rolling process known in the art. The metallic strip 301 is rolled to form a plurality of regions of varying profile thicknesses. In step 203, two metallic plates 303A and 303B (shown in FIG. 3) are punched from the hot rolled metallic strip 301. The process of punching the two metallic plates 303A and 303B from the metallic strip 301 is explained in detail in conjunction with the description of FIG. 3. In step 205, the metal plates 303A and 303B are hot formed to produce the two metal reinforcements 100 for the left and the right B-pillars.

In an embodiment, the metallic strip 301 may be formed of ultra-high-strength steel. From the strip, plates 303A and 303B may be hot formed into metal reinforcements for the left and the right B-pillars of an automotive vehicle. During hot forming, there is almost negligible strain hardening on the plates 303A and 303B, because they are reshaped at a temperature above the recrystallization, which is significantly above normal room temperature.

Figure 3:
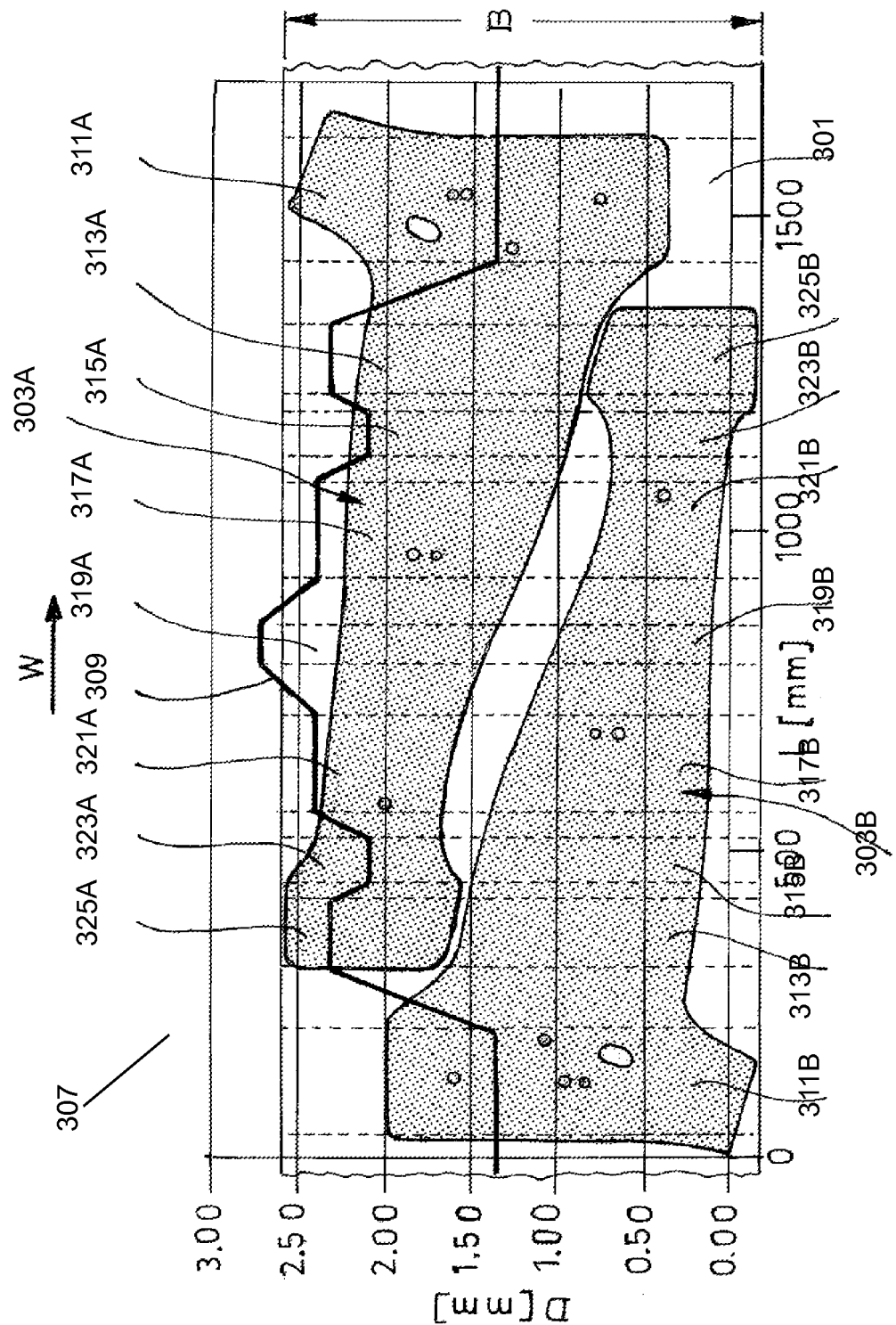
FIG. 3 is a schematic of a hot rolled metal strip having two metal plates which are intended to be punched therefrom, according to an embodiment of the present disclosure.

FIG. 3 is a top view 300 of a hot-formed tailor rolled blank 301 from which two metal plates 303A and 303B may be punched. The metal strip includes multiple regions having varying profile thicknesses. The outline of hot-formed tailor rolled blank 301 is superimposed onto a graph 307 (not drawn to scale), as shown. The horizontal axis of the graph 307 represents the length (mm) of the metallic strip 301 and the vertical axis represents the profile thickness (mm) of the metallic strip 301. The horizontal axis includes increments of 0.5 mm, and the vertical axis includes increments of 100 mm, as shown.

The graph 307 includes a curve 309 which represents the change in the profile thickness of the m hot-formed tailor rolled blank 301, with respect to its length. The portions of the curve 309 with a '0' slope are the profile thickness of the hot-formed tailor rolled blank 301 in different regions. Further, the portions of the curve with a finite slope are the transitions between the different regions of the hot-formed tailor rolled blank 301 of varying profile thickness. The portions of the curve with a finite slope show that there are continuous transitions between the multiple regions of varying thickness. More specifically, the portions of the curve with an increasing slope represent a transition of a region of a lower profile thickness to a region of a higher profile thickness. For example, an increasing slope exists between the region 311B and 313B. Further, the portions of the curve with a decreasing slope represent a transition of a region of a higher profile thickness to a lower profile thickness. For example, a decreasing slope exists between the regions 325A and 323A.

The two metal plates 303A and 303B are punched from the hot-formed tailor rolled blank 301. These plates follow the outline of the metal reinforcement 100. Each metal plate 303A and 303B includes a lower region 311A and 311B, respectively, and an upper structure. The upper structure of the plates 303A and 303B include multiple regions 313A-325B and 313A-313B, respectively.

The plates 303A and 303B are arranged on the metallic strip 301 to minimize metal waste from the punching process. That arrangement requires positioning the diagrams on the graph produce as little intermediate space as possible. Here, that process requires placing plates 303A and 303B adjacent to each other and rotating one of the plates by 180 degrees. Further, the two plates 303A and 303B are offset from each, with plate 303A offset in the +W direction, and plate 303B is offset in the −W direction. Furthermore, the two metal plates 303A and 303B are mutually offset so that the lower region 311A of the metal plate 303A does not adjoin any region of the metal plate 303B. Similarly, the lower region 311B of the metal plate 303B does not adjoin any region of the metal plate 303A.

Although the current invention has been described comprehensively, in considerable details to cover the possible aspects and embodiments, those skilled in the art would recognize that other versions of the invention are also possible.

The invention claimed is:

1. A metallic reinforcement structure for a B-pillar of an automotive vehicle, the structure comprising:
   a lower flange adapted to adjoin a door sill structure of the vehicle; and
   an upper structure integral with and extending vertically upwards from the lower flange, the upper structure including:
      a central portion; and
      a plurality of paired regions spaced vertically apart from the central portion, each paired region having two members, the members of each paired region being arranged vertically symmetrical with respect to the central portion;
         offset from the central portion by substantially the same distance; and
         formed to substantially the same predetermined thickness;
      wherein the predetermined thickness of each paired region differs from the thickness of other paired regions and the central portion.

2. A metal reinforcement of claim 1, extending over the entire height of the B-pillar.

3. A metal reinforcement of claim 1, wherein the central portion of the upper structure has a thickness greater than the thickness of each of the plurality of regions.

4. The metal reinforcement of claim 1, wherein the central portion has a thickness of at least 2 mm.

5. The metal reinforcement of claim 1, wherein the plurality of regions of the upper structure have continuous transitions between them.

6. The metal reinforcement of claim 1, wherein the lower flange is not a part of the symmetrical arrangement.

7. The metal reinforcement of claim 1, wherein the lower flange has a thickness less than 1.5 mm.

8. The metal reinforcement of claim 1, wherein the plurality of regions include a lower most region adjoining the lower flange, and an uppermost region adapted to adjoin a roof frame of the vehicle, the lowermost region and the uppermost region having same thicknesses.

* * * * *